(12) United States Patent
Schomaker

(10) Patent No.: US 6,830,167 B2
(45) Date of Patent: Dec. 14, 2004

(54) BOX LID, METHOD FOR MANUFACTURING A BOX LID, AND PICKUP TRUCK BED BOX

(75) Inventor: Jerome A. Schomaker, Granger, IN (US)

(73) Assignee: Lund International Inc., Anoka, MN (US)

(*) Notice: Subject to any disclaimer, the term of this patent is extended or adjusted under 35 U.S.C. 154(b) by 173 days.

(21) Appl. No.: 10/210,784

(22) Filed: Jul. 31, 2002

(65) Prior Publication Data

US 2004/0020952 A1 Feb. 5, 2004

(51) Int. Cl.⁷ .................................................. B60R 9/00
(52) U.S. Cl. .................. 224/404; 220/592.25; 220/902; 224/543; 264/328.1
(58) Field of Search ................................ 224/404, 543; 220/200, 592.1, 592.25, 810, 902; 264/328.1

(56) References Cited

U.S. PATENT DOCUMENTS

| | | | | |
|---|---|---|---|---|
| 3,078,003 A | * | 2/1963 | Kesling ................... 220/592.1 |
| 3,678,703 A | * | 7/1972 | Cornish et al. .............. 62/371 |
| 3,799,386 A | * | 3/1974 | Madalin et al. ............. 206/564 |
| 3,871,521 A | * | 3/1975 | Szatkowski ................ 206/524 |
| 3,948,407 A | * | 4/1976 | Puterbaugh ................ 220/4.01 |
| 4,107,833 A | * | 8/1978 | Knight et al. ............ 220/592.1 |
| 4,668,567 A | * | 5/1987 | Williams ............... 220/592.25 |
| 5,111,955 A | * | 5/1992 | Baker et al. ................ 220/303 |
| 5,588,731 A | * | 12/1996 | Schmidt et al. ............. 312/405 |
| 5,597,086 A | * | 1/1997 | King-Shui ............. 220/592.25 |
| 5,671,991 A | * | 9/1997 | Grant ...................... 220/592.1 |
| 5,720,407 A | * | 2/1998 | Hoffman .................... 220/215 |
| 5,722,133 A | * | 3/1998 | Farris et al. .................... 27/17 |
| 5,876,811 A | * | 3/1999 | Blackwell et al. ........... 220/902 |
| 6,030,560 A | * | 2/2000 | Bortz, Jr. .................... 264/338 |
| 6,138,432 A | * | 10/2000 | Banicevic ................ 52/784.15 |
| 6,295,787 B1 | * | 10/2001 | Lee .......................... 220/592.1 |
| 2001/0032848 A1 | * | 10/2001 | Jones et al. ................. 220/200 |

FOREIGN PATENT DOCUMENTS

| | | | |
|---|---|---|---|
| EP | 864511 A1 | * | 9/1998 |
| FR | 2601656 A1 | * | 1/1988 |
| GB | 1152037 | * | 5/1969 |
| JP | 1-159214 A | * | 6/1989 |

OTHER PUBLICATIONS

"Diamond Brite Tool Boxes by Challenger", Delta III, Inc., front cover, p. 1–2, back cover (Date Unknown).
"DeeZee: The Quality Truck Accessory People: 1993 Catalog", DeeZee, Inc., front cover, pp. 1–23, back cover (1993).
"Deflecta–Shield Aluminum Products", Lund International front cover, pp. 1–13, back cover (2001–2002).

* cited by examiner

Primary Examiner—Gary E. Elkins
(74) Attorney, Agent, or Firm—Merchant & Gould P.C.

(57) ABSTRACT

A box lid that can be used on a truck box is provided according to the invention. The box lid includes an outer box lid member constructed to fit over a box, an inner box lid member attached to the outer box lid member to provide a cavity between the outer box lid member and the inner box lid member, and injection foam provided within the cavity between the outer box lid member and the inner box lid member. The outer box lid member includes a cover member having a periphery, and a depending wall extending along the cover member periphery. The injection foam can be polyurethane foam. A method for manufacturing a box lid and a pickup truck bed box are provided.

21 Claims, 3 Drawing Sheets

BOX LID, METHOD FOR MANUFACTURING A BOX LID, AND PICKUP TRUCK BED BOX

FIELD OF THE INVENTION

The invention relates to a truck bed box lid, a method for manufacturing a truck bed box lid, and a truck bed box.

BACKGROUND OF THE INVENTION

Boxes are often found in pickup truck beds. In general, a pickup truck bed box is a box located behind the cab of a pickup truck and extends from one sidewall of the bed to the other sidewall. People often use the box for storing tools or other items that should be protected from the elements or protected from theft. Pickup truck bed boxes are available from Lund Industries, Incorporated; Delta Consolidated, Incorporated; DeeZee, Inc.; and United Welding Supply.

SUMMARY OF THE INVENTION

A box lid that can be used on a truck box is provided according to the invention. The box lid includes an outer box lid member constructed to fit over a box, an inner box lid member attached to the outer box lid member to provide a cavity between the outer box lid member and the inner box lid member, and injection foam provided within the cavity between the outer box lid member and the inner box lid member. The outer box lid member includes a cover member having a center area and a periphery, and a depending wall extending along the cover member periphery. The injection foam can be polyurethane foam.

A method for manufacturing a box lid that can be used on a truck box is provided according to the invention. The method includes steps of attaching an outer box lid member and an inner box lid member together to provide a cavity between the outer box lid member and the inner box lid member, injecting an injection foam through an opening in the inner box lid member into the cavity to fill the cavity and cause pressure to be exerted on the outer box lid member and the inner box lid member, and sealing the opening in the inner box lid member. The injection foam can be provided as a two-part foaming composition that, when mixed, results in the formation of a polyurethane foam.

A pickup truck bed box is provided according to the invention. The pickup truck bed box includes a box having a bottom wall, side walls, and an opening. The box is constructed to fit within the bed of a pickup truck and extend between a pickup truck left bed side wall and a pickup truck right bed side wall. The box lid includes an outer box lid member constructed to fit over the box opening and an inner box lid member attached to the outer box lid member to provide a cavity between the inner box lid member and the outer box lid member, and injection foam provided within the cavity between the outer box lid member and the inner box lid member. The box additionally includes a hinge member attaching the box lid to the box side wall. The hinge member can be attached to the outer box lid member.

DETAILED DESCRIPTION

Figure 1:
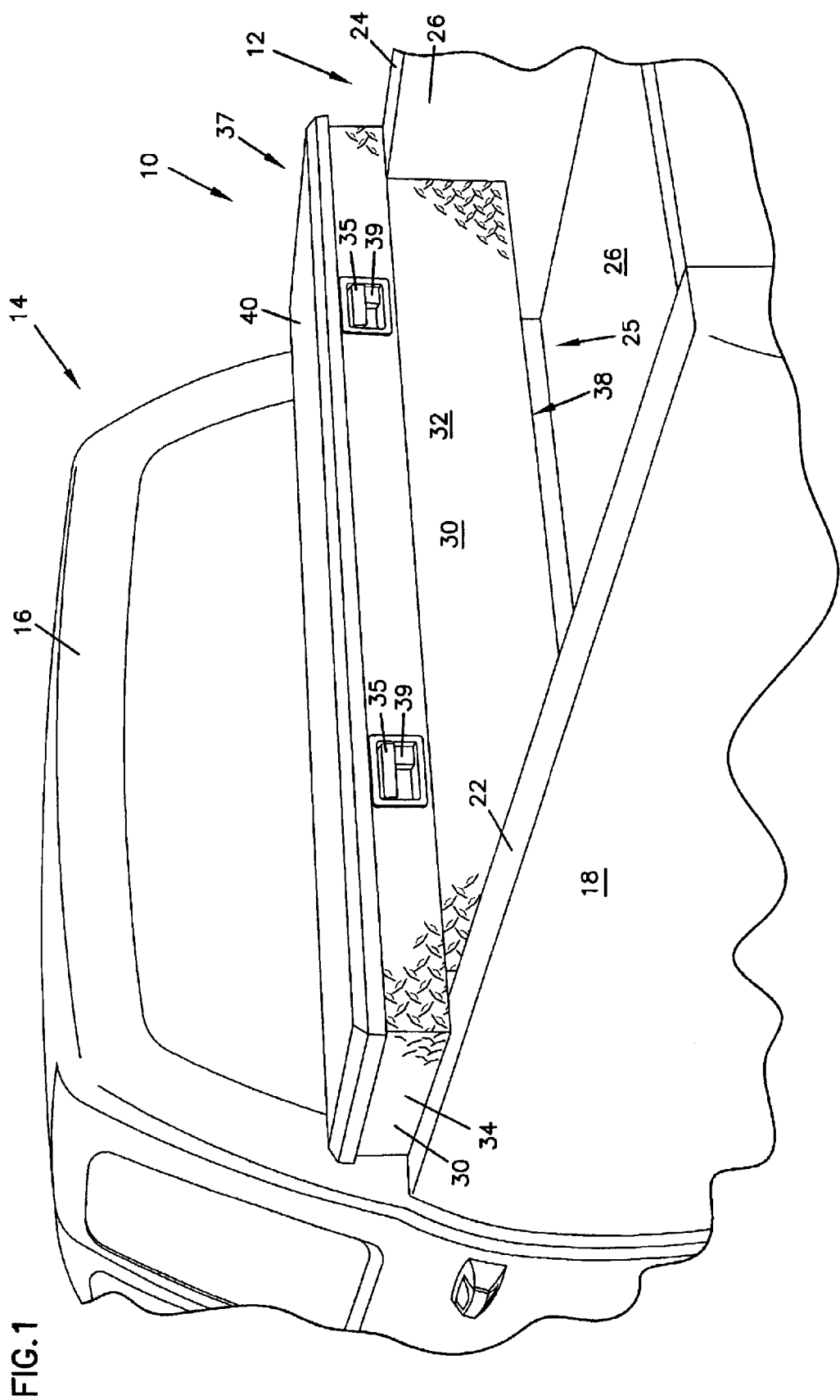
FIG. 1 is a perspective view of a truck bed box provided in the bed of a pickup truck according to the principles of the invention.

Referring to FIG. 1, a truck bed box is shown at reference number 10 in the bed 12 of a pickup truck 14. The truck bed box 10 can be referred to more simply as the box. The box 10 is located behind the pickup truck cab 16 and is provided between the pickup truck left bed sidewall 18 and the pickup truck bed right sidewall 20. The box 10 is shown having a construction that extends between the left pickup truck sidewall 18 and the right pickup truck sidewall 20, and over the left pickup truck sidewall top surface 22 and the right pickup truck sidewall top surface 24. It should be understood that a box according to the invention need not have a structure that allows it to rest on the side wall top surfaces 22 and 24. In addition, the box 10 can be attached to the pickup truck 12 in a manner that is conventional for prior art truck bed boxes. In addition, a gap 25 can be provided between the box 10 and the pickup truck bed floor 26.

The box 10 includes a plurality of side walls 30. The box 10 includes a rear side wall 32, a left side wall 34, a right side wall (not shown), and a front side wall (not shown) facing the pickup truck cab 16. In addition, the box 10 includes a bottom wall 38 and a lid 40. A latching mechanism 35 can be provided for holding the lid 40 in a closed position 37. The latching mechanism 35 can include a lock 39. The side walls, the bottom wall, and the latching mechanism of the box can be identical to the side walls, bottom wall, and latching mechanism of prior art boxes that are available from Lund Industries, Incorporated; Delta Consolidated, Incorporated; DeeZee, Inc.; and United Welding Supply.

Figure 2:
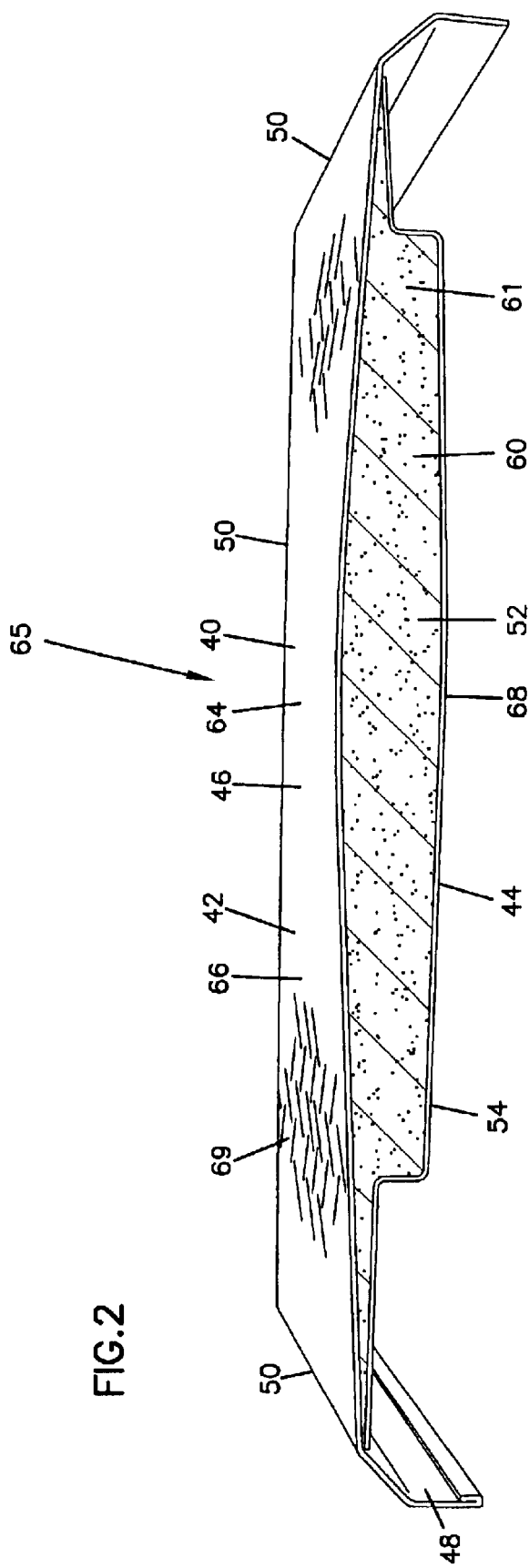
FIG. 2 is a sectional view of the box lid of the truck bed box of FIG. 1.

Now referring to FIG. 2, the lid 40 is shown having an outer box lid member 42 and an inner box lid member 44. The outer box lid member 42 includes a cover member 46 and a depending wall 48. The cover member 46 and the depending wall 48 meet at the cover periphery 50 that extends around the circumference of the cover member 46.

The inner box lid member 44 attaches to the outer box lid member 42 to create a cavity 52. The inner box lid member 44 can be referred to as a pan 54 and can attach to the cover member 46 along the periphery 50. The inner box lid member 44 can be attached to the outer box lid member 42 by any technique that adequately holds the inner box lid member 44 to the outer box lid member 42. An exemplary technique includes welding. Exemplary welding techniques that can hold the inner box lid member 44 to the outer box lid member 42 include MIG welding and TIG welding. In general, this technique for welding can be applied at intervals such as one inch for every six inches of length.

The cavity 52 can be filled with an injection foam 60 that results in a cured foam 61. The injection foam 60 is the result of injecting a foaming composition into the cavity 52. The foaming composition can be a material that, when injected into the cavity 52, fills the cavity and cures to provide desired structural support between the outer box lid member 42 and the inner box lid member 44. The cured foam 61 can be provided so that it adheres to the outer box lid member 42 and the inner box lid member 44. As the foaming composition cures or hardens to form the cured foam 61, it tends to bow the outer box lid member 42 to provide a dome effect 64 in the outer box lid member 42. The dome effect 64 refers to a bulging or a hill in the center area 65 of the outer box lid member 42 that slopes to the periphery 50. In general, the dome effect 64, if it is present at all, can be present in an amount sufficient to help assist in the run-off of water from the top surface 66 of the outer box lid member 42. That is, as rain water falls on the top surface 66, the water will be less likely to pool or puddle on the top surface 66 because the dome effect 64 will cause it to run off. The inner box lid member 44 can exhibit a dome effect 68. The dome effects 64 and 68 are preferably not severe enough to cause an unsightly appearance or to cause a warping or bending of the lid 40.

The foaming composition can push against the outer box lid member 42 as it expands and cures to provide the cured foam 61 to remove waviness that may be present. The outer box lid member 42 can be provided from diamond plate material 69 that is commonly available in a coil. Diamond plate material is commonly available and is often provided in the form of aluminum diamond plate material. When the diamond plate material 69 is unwound, it often exhibits a wavy form or appearance. The foaming composition can be use to help straighten the diamond plate material 69 and/or to help remove the waviness that may be present. The existence of the dome effect is believed to provide the lid 40 with a desired level of rigidity. That is, as the injection foam expands to create the dome effect, the pressure within the lid 40 is believed to provide an increase in rigidity. The dome effect can be characterized by a height difference between the center area 65 and the periphery 50 that is sufficient to allow water to run off the lid 40. This difference in height can be at least about ⅛ inch. It is expected that this difference in height will be less than ½ inch, and can be between about ⅜ inch and about ½ inch.

The foaming composition that cures to form the cured foam 61 can be any foaming material that provides the desired level of support between the outer box lid member 42 and the inner box lid member 44, and that provides the desired level of sound deadening quality. In addition, the foaming composition is preferably a material that can be injected into the cavity 52 and that fills the cavity 52 without bursting the connection between the outer box lid member 42 and the inner box lid member 44. In addition, the foaming composition is preferably material that maintains its shape and volume as it cures. An exemplary foaming composition includes a two-part, reactive foaming composition. When the two parts are mixed together, the reaction begins causing the composition to foam and cure. An exemplary two-part foaming composition is a two-part foaming composition that reacts to form a polyurethane foam. An exemplary polyurethane foam is available from Sealed Air. The density of the polyurethane foam can be selected to provide the lid 40 with a desired level of structural support and with a desired weight. In general, it is expected that a heavier foam will be more desirable because the weight can be seen by a customer as reflecting a stronger product. The density of the foam can be between about 0.2 lb/ft$^3$ and about 6 lb/ft$^3$. In addition, the foam can be provided having a density of between about 0.3 lb/ft$^3$ and about 5 lb/ft$^3$, and can be provided in a range of between about 0.5 lb/ft$^3$ and about 3 lb/ft$^3$. It is expected that a desired foam density that can be used according to the invention is between about 1.1 lb/ft$^3$ and about 1.4 lb/ft$^3$.

Figure 4:
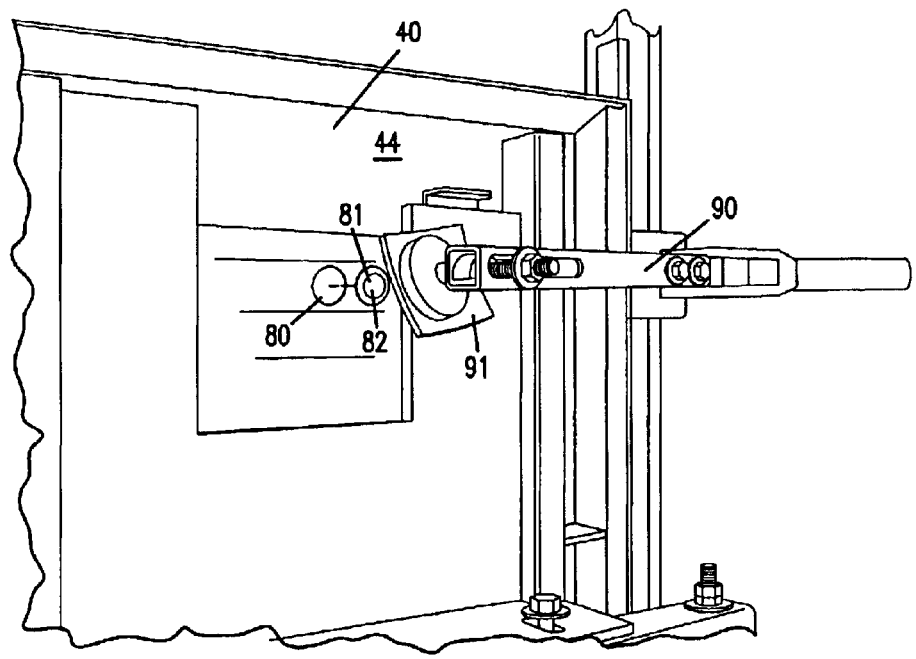
FIG. 4 is a perspective view of an assembly step in the production of a box lid according to the principles of the invention.
Figure 3:
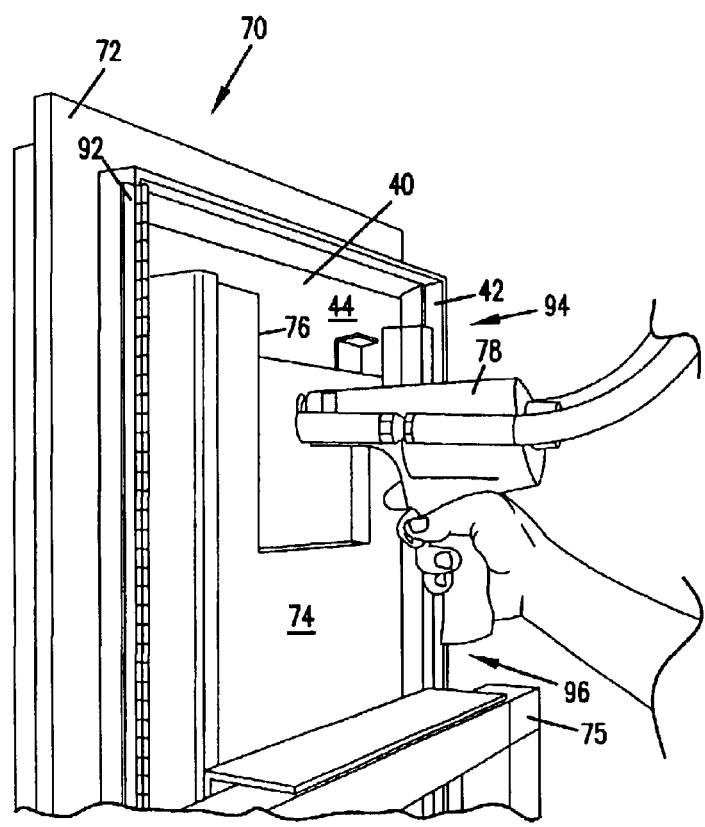
FIG. 3 is a perspective view of an assembly step in the production of a box lid according to the principles of the invention.

Now referring to FIGS. 3 and 4, steps in the manufacture of the lid 40 are shown. The outer box lid member and the inner box lid member 44 are attached together and placed in a molding frame 70 that is constructed to hold the lid 40 in place while the foaming composition is injected into the cavity 52. The molding frame 70 includes an outer box lid support 72 and an inner box lid support 74. The outer box lid support 72 is constructed to allow the outer box lid member 42 to rest against it. The inner box lid support 74 is placed against the inner box lid member 44 and is held in place by a clamping structure 75 to prevent separation between the outer box lid member 42 and the inner box lid member 44 during injection of the foaming composition into the cavity 52. The inner box lid support 74 includes an opening 76 that allows a foam injector 78 to inject a predetermined amount of the foaming composition into the cavity 52 via an opening 80 in the inner box lid member 44. The opening 80 can be prepared by drilling or punching a hole in the inner box lid member 44. The opening 80 can be created before the inner box lid member 44 is attached to the outer box lid member 42.

A metered amount of the foaming composition can be injected into the cavity 52. It is expected that if too much of the foaming composition is injected into the cavity 52, the lid 40 will burst. If too little foaming composition is injected into the cavity 52, it is expected that the doming effect will not be achieved.

The foaming composition should be injected into the cavity relatively quickly. The foaming composition can be injected into the cavity within about 4 seconds. It is expected that the foaming composition begins rapidly foaming within about 3 to 5 seconds after it enters the cavity 52. As the foaming composition enters the cavity 52, it falls to the bottom of the cavity 52. As shown in FIG. 3, the lid 40 is arranged vertically so that opening 80 is located in the upper portion 94 of the lid 40 and the foaming composition falls to the lower portion 96 of the lid 40. As the foaming composition falls into the lower portion 96 of the lid 40, it begins expanding. Accordingly, the doming effect begins in the lower portion 96 and advances into the upper portion 94. As a result, it is desirable to provide a sufficient amount of the foaming composition into the cavity 52 in order to get a relatively even degree of foaming across the lid 40.

Once the foaming composition is injected into the cavity 52, a cover 81 can be applied to the opening 80 to seal the opening during expansion of the foaming composition. The cover 81 can be a plug 82 that inserts into the opening 80. A clamp 90 can be used to hold a clamp face 91 over the plug 82 in the opening 80. The plug 82 can be any device that sufficiently closes the opening 80. An exemplary type of plug that can be used is a snap in plug that, once pushed into an opening, remains in the opening. Snap in plugs are commonly available and are often used as electrical conduit plugs. It should be understood that the plug can be provided from a metallic material or a plastic material.

Once the foaming composition has cured and the opening 80 is sufficiently sealed, the lid 40 can be removed from the molding frame 70 and attached to the box 10. A hinge 92 can be provided along a side of the lid 40. The hinge 92 can be attached after the step of injecting a foaming composition into the cavity 52, or it can be attached before or during the step of injecting a foaming composition into the cavity 52.

Althogh not shown in the FIGS., the lid 40 can include a "strike" for catching the latching mechanism 35. The strike can be welded to the inner box lid member and/or the inside surface of the outer box lid member. In addition, although the inner box lid member 44 is shown in FIG. 2 having a hat shape, the inner box lid member can be provided with any configuration and can be relatively flat.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A box lid comprising:
   (a) an outer box lid member constructed to fit over a box, the box having side walls and an opening, for covering the opening, the outer box lid member comprising:
      (i) a cover member having a center area and a periphery; and
      (ii) a depending wall extending along the cover member periphery;
   (b) an inner box lid member attached to the outer box lid member to provide a cavity between the outer box lid member and the inner box lid member; and
   (c) injection foam provided within the cavity between the outer box lid member and the inner box lid member, wherein the cover member exhibits a dome appearance as a result of pressure created by the injection foam on the outer box lid member and the inner box lid member.

2. A box lid according to claim 1, further comprising:
   (a) a hinge member attached to the outer box lid member along the depending wall.

3. A box lid according to claim 1, wherein the cover member and the depending wall are constructed so that the depending wall extends over the box side walls.

4. A box lid according to claim 1, wherein the inner box lid member is welded to the outer box lid member.

5. A box lid according to claim 1, wherein the inner box lid member comprises a plug covering an opening used for injecting the injection foam into the cavity.

6. A box lid according to claim 1, wherein the injection foam comprises a polyurethane foam having a density of between about 0.3 lb/ft$^3$ and about 5 lb/ft$^3$.

7. A box lid according to claim 1, wherein the outer box lid member comprises diamond plate.

8. A box lid according to claim 1, wherein the injection foam is adhered to the outer box lid member and the inner box lid member.

9. A box lid according to claim 1, wherein the outer box lid member comprises a cover member exhibiting a dome effect.

10. A box lid according to claim 9, wherein the dome effect is exhibited by a height difference between the center area and the periphery of at least ⅛ inch.

11. A method for manufacturing a box lid, the method comprising steps of:
    (a) attaching an outer box lid member and an inner box lid member together to provide a cavity between the outer box lid member and the inner box lid member, wherein the outer box lid member comprises a cover member having a center area and a periphery, and a depending wall extending along the cover member periphery, and wherein the inner box lid member comprises an opening to access the cavity;
    (b) injecting an injection foam through the opening in the inner box lid member into the cavity to fill the cavity and cause pressure to be exerted on the outer box lid member and the inner box lid member as a result of the curing of the injection foam, wherein the cover member exhibits a dome appearance as a result of the pressure created by the injection foam on the outer box lid member and the inner box lid member; and
    (c) sealing the opening in the inner box lid member.

12. A method according to claim 11, wherein the injection foam comprises a two part mixture.

13. A method according to claim 11, wherein the injection foam comprises a polyurethane foam.

14. A method according to claim 11, wherein the injection foam comprises a polyurethane foam a density of between about 0.3 lb/ft$^3$ and about 5 lb/ft$^3$.

15. A method according to claim 11, wherein the step of sealing comprises placing a plug within the opening.

16. A method according to claim 11, comprising attaching a hinge to the depending wall.

17. A method according to claim 11, wherein the outer box lid member comprises diamond plate.

18. A method according to claim 11, wherein the box lid member comprises a cover member exhibiting a dome effect comprising a height difference between the center area and the periphery of at least ⅛ inch.

19. A pickup truck bed box comprising:
    (a) a box comprising a bottom wall, side walls, and an opening, wherein the box is constructed to fit within the bed of a pickup truck and extend between a pickup truck left bed side wall and a pickup truck right bed side wall;
    (b) a box lid comprising:
       (i) an outer box lid member constructed to fit over the box opening comprising a cover member having a center area and a periphery, and a depending wall extending along the cover member periphery;
       (ii) an inner wall box lid member attached to the outer box lid member to provide a cavity between the outer box lid member and the inner box lid member; and
       (iii) injection foam provided within the cavity between the outer box lid member and the inner box lid member, wherein the cover member exhibits a dome appearance as a result of pressure created by the injection foam on the outer box lid member and the inner box lid member; and
    (c) a hinge member attached to the depending wall and the box side wall.

20. A pickup truck bed box according to claim 19, further comprising:
    (a) a latch for holding the box lid closed covering the box opening.

21. A pickup truck bed box according to claim 19, wherein the outer box lid member comprises a cover member exhibiting a dome effect having a difference in height between the center area and the periphery of at least ⅛ inch.

* * * * *